April 2, 1946.  I. T. MINYARD  2,397,679

PARAFFIN SCRAPER

Filed March 12, 1945

Inventor
Ira T. Minyard
By Jack A. Ashley
Joseph H. Ashley
Attorneys

Patented Apr. 2, 1946

2,397,679

UNITED STATES PATENT OFFICE 2,397,679

PARAFFIN SCRAPER

Ira T. Minyard, Odessa, Tex.

Application March 12, 1945, Serial No. 582,303

2 Claims. (Cl. 166—18)

This invention relates to new and useful improvements in paraffin scrapers.

One object of the invention is to provide an improved paraffin scraper adapted to be immovably clamped around a fluid-conducting pipe, which is vertically movable in a well tubing, whereby upon periodic vertical movements of the pipe, the paraffin lodging on the inner surface of the tubing and sometimes seriously impeding the upward flow of well fluid through the relatively restricted area between the pipe and tubing, may be scraped from said surface and carried out by the well fluid.

A particular object of the invention is to provide an improved paraffin scraper including a pair of elongate complementary members, each having a scraping element and clamping means, whereby said members when disposed longitudinally in reverse relation to each other, may be rigidly clamped on a movable pipe or other support.

A further object of the invention is to provide an improved paraffin scraper including generally, elongate arcuate members, each having slightly inclined vertical edge portions provided with clamp flanges and clamp grips, whereby when the members are inverted or reversed, the flanges of one member may be engaged in the grips of the other member and by longitudinal movement of one member with relation to the other member, the scraper may be frictionally clamped around a pipe or other support without the aid of auxiliary fastenings.

A construction designed to carry out the invention will be hereinafter described together with other features of the invention.

The invention will be more readily understood from a reading of the following specification and by reference to the accompanying drawing, wherein an example of the invention is shown, and wherein.

Figure 1:
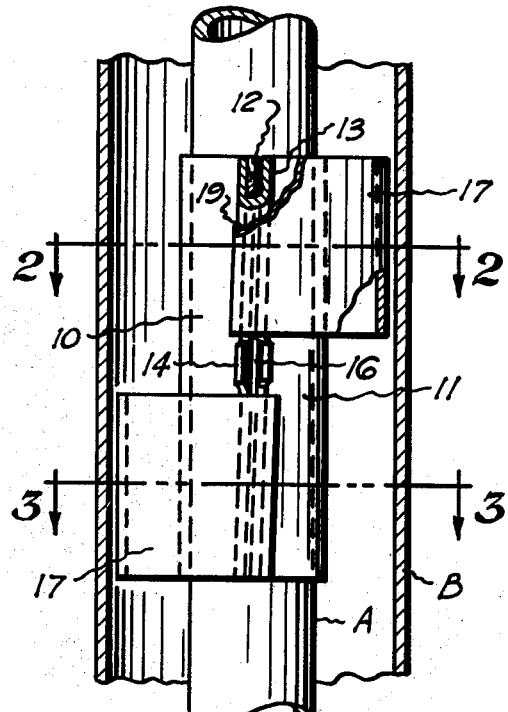
Fig. 1 is a view partly in elevation and partly in section, of portions of a pipe and a surrounding tubing with a paraffin scraper constructed in accordance with the invention, clamped around said pipe.
Figure 2:
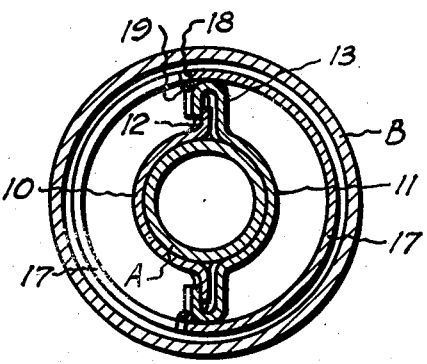
Fig. 2 is a horizontal cross-sectional view taken on the line 2—2 of Fig. 1.
Figure 3:
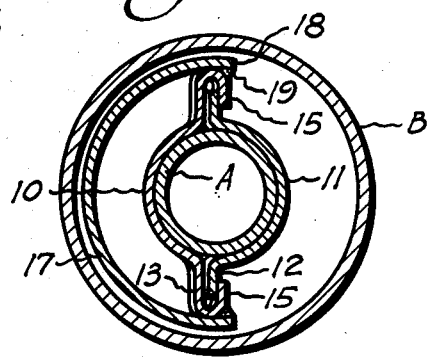
Fig. 3 is a similar view taken on the line 3—3 of Fig.1.
Figure 4:
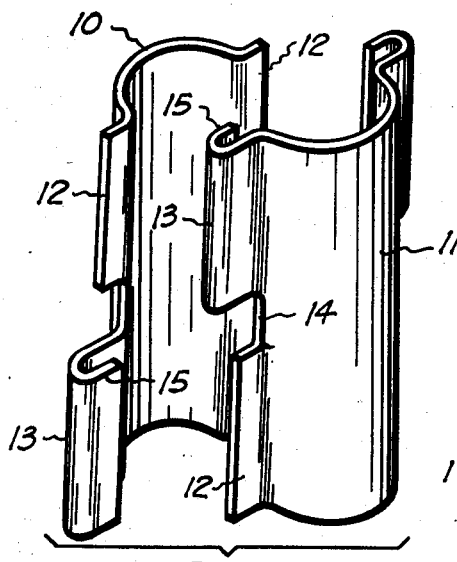
Fig. 4 is a composite view of the two clamp members, the scraper blades being omitted.
Figure 5:
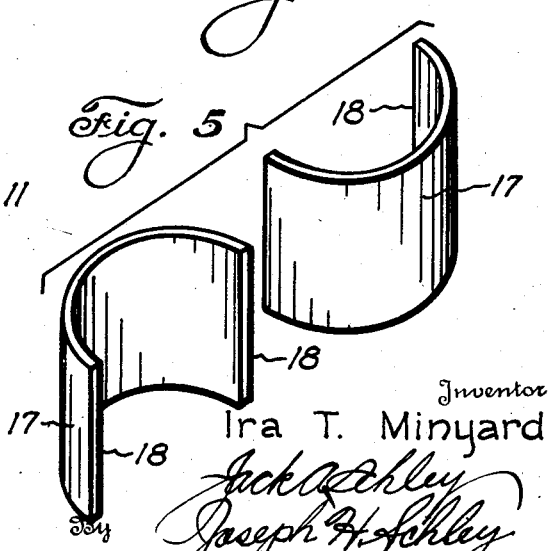
Fig. 5 is a similar view of the scraper blades.

In the drawing, the numeral 10 designates an elongate scraper member and 11, a companion or complementary member, such members being substantially duplicates, but used in reversed relation. Each member is given an arcuate shape in cross-section and its inner surface is preferably struck on an arc approximately the same as the arc of the outer surface of the pipe or cylindrical support on which the member is to be mounted. This assures a reasonably close fit between the member and the pipe, as is shown in the drawing, where the members 10 and 11 are clamped around a pipe A. The pipe A will usually have a relatively small o. d., as from ¾ of an inch to 1 inch.

The edges of each member are inclined with respect to the perpendicular, but in substantially the same rectilinear plane, so that when one of the members is inverted and the members brought together, their edge portions will be substantially parallel. Each member has at one side of its medial portion, outwardly directed transverse flanges 12, extending along its edge portions to the end of the member; while on the side of said medial portion, folded or substantially U-shaped grips 13 are provided along the edge portions of said member. By this formation a medial gap or recess 14 is produced between the adjacent flange and grip along each edge portion of each member.

In mounting the members 10 and 11 on the pipe A, the member 10 is placed against the pipe and the member 11, having been inverted or reversed, is placed against the pipe just above member 10 and the lower ends of its flanges inserted in the upper ends of the grips 13 of member 10 and the lower ends of its grips receiving the upper ends of the flanges of said member 10. This assembly is permissible for the reason that the return fold or bend 15 of each grip, overhangs or is offset, arcuately of the member which permits the flanges 12 of one member to longitudinally bypass the flanges 12 of the other member.

After the members have been assembled, the member 11 is driven downwardly; while the member 10 is held against movement. When the members are initially assembled, the member 11 will be spaced slightly from the pipe A, owing to upward inclination of the edge portions; consequently as the member 11 is driven downwardly, its arcuate inner surface gradually approaches the outer arcuate surface of the pipe, such surfaces finally making contact and providing a frictional engagement. When the upper ends of the members reach substantial transverse alinement, the frictional clamping will be completed and the flanges 12 will be tightly held in the grips 13. The cross-sectional area of the opening of each grip 13, may be such as to provide free longitudinal sliding play for the flanges until the members frictionally engage the pipe, after which the flanges will bind in the grips.

It will be observed that the gaps 14 will substantially register when the members are clamped together on the pipe; further, the edge portions of the members may be slightly spaced apart; as indicated at 16 in Fig. 1. This is due to forming the arcuate portion of each member short of a full semicircle and thus, ample play is left for irregularities in the outer surface of the pipe A and a rigid fastening of the members is assured.

The actual scraper blades mounted upon the members 10 and 11, may vary somewhat in construction. I have illustrated arcuate scraper blades 17 and the outer longitudinal bends of the grips 13 are inserted between the vertical edges 18 of the blades and fastened therebetween by welding as indicated at 19 in the drawing. These blades are preferably curved on an arc concentric to the inner surface of the tubing B, but at a slightly less radius so as to provide ample clearance to permit the pipe A with the scraper thereon to be freely lowered in the tubing.

In using the scraper, it is merely necessary at suitable intervals of time, according to paraffining conditions, to raise and lower the pipe A, whereby the blades 17 will scrape paraffin from the inner surface of the tubing B. The scrapers are spaced up and down the pipe A at distances equal to the overall vertical movement of the pipe and thus all paraffin in the paraffin zone is removed. Since this can be done while well fluid is flowing upwardly in the tubing and there is ample flow space between each blade and its correlated clamp member, the paraffin scrapings will be carried out by the well fluid.

It is preferable to make the parts of the device from metal sheets of suitable thickness. The members 10 and 11 as well as the blades 17 can be cut from such sheets or provided from strips, in the form of blanks and then processed in accordance with manufacturing procedure. When it is desired to remove the scraper from a pipe, it is merely necessary to drive the members 10 and 11 apart longitudinally of the pipe.

The foregoing description of the invention is explanatory thereof and various changes in the size, shape and material, as well as in the details of the illustrated construction may be made, within the scope of the appended claims, without departing from the spirit of the invention.

What I claim and desire to secure by Letters Patent is:

1. A paraffin scraper including, a sheet metal body composed of a pair of identical elongate substantially concavo-convexo members elongate for cooperative frictional clamping engagement with a cylindrical support, each of said members having one of its ends bent to provide a pair of opposed longitudinally extending inwardly facing inclined channels and its opposite end bent to provide a pair of opposed outwardly extending inclined flanges spaced from said channels, said channels of each of said members being formed to receive the outwardly extending flanges of the other of said members when said members are engaged and moved toward each other in a direction along the longitudinal axis of said members, and an outwardly extending arcuate cutting element carried by and connecting the outer bend of the channel portions of each of said members, each of said cutting elements having its ends disposed so as to overlie the ends of the other of said cutting elements, whereby to provide a cutting action throughout the entire circumference of a cylindrical support with which the scraper is used.

2. A paraffin scraper including, a sheet metal body composed of a pair of identical elongated substantially concavo-convexo members formed for cooperative frictional clamping engagement with a cylindrical support, each of said members having one of its ends bent to provide a pair of opposed longitudinally extending inwardly facing inclined channels and its opposite end bent to provide a pair of opposed outwardly extending inclined flanges spaced from and disposed in longitudinal alinement with said channels, said channels of each of said members being formed to receive the outwardly extending flanges of the other of said members when said members are engaged and moved toward each other in a direction along the longitudinal axis of said members, and an outwardly extending arcuate cutting element carried by and connecting the outer bend of the channel portions of each of said members, each of said cutting elements having its ends disposed so as to overlie the ends of the other of said cutting elements, whereby to provide a cutting action throughout the entire circumference of a cylindrical support with which the scraper is used.

IRA T. MINYARD.